(12) United States Patent
Giuliani et al.

(10) Patent No.: US 9,522,757 B2
(45) Date of Patent: Dec. 20, 2016

(54) METHOD AND UNIT FOR FORMING TUBULAR LENGTHS OF WEB MATERIAL PARTICULARLY IN A LABELLING MACHINE

(71) Applicant: SIDEL S.p.A. con Socio Unico, Parma (IT)

(72) Inventors: Mattia Giuliani, Parma (IT); Mirko Rossi, Parma (IT); Antonio Secchi, Parma (IT)

(73) Assignee: SIDEL S.p.A. con Socio Unico, Parma (IT)

( * ) Notice: Subject to any disclaimer, the term of this patent is extended or adjusted under 35 U.S.C. 154(b) by 223 days.

(21) Appl. No.: 14/529,434

(22) Filed: Oct. 31, 2014

(65) Prior Publication Data

US 2015/0129117 A1    May 14, 2015

Related U.S. Application Data

(62) Division of application No. 13/765,295, filed on Feb. 12, 2013, now abandoned.

(30) Foreign Application Priority Data

Feb. 13, 2012 (IT) .............................. TO2012A0125

(51) Int. Cl.
*B65C 3/06* (2006.01)
*B65C 3/08* (2006.01)
(Continued)

(52) U.S. Cl.
CPC ............... *B65C 3/163* (2013.01); *B29C 53/44* (2013.01); *B29C 63/426* (2013.01);
(Continued)

(58) Field of Classification Search
CPC ............ B65C 3/06; B65C 3/163; B65C 3/166; B65C 3/26; B65C 9/24; B65C 9/25; B29C 63/18; B29C 53/40–53/44; B29C 66/91423; Y10T 156/1036; Y10T 156/1038
(Continued)

(56) References Cited

U.S. PATENT DOCUMENTS

| | | | | |
|---|---|---|---|---|
| 4,832,774 A | * | 5/1989 | DiFrank | B65C 3/16 156/215 |
| 5,491,010 A | * | 2/1996 | Eder | B65C 3/16 215/12.1 |

(Continued)

FOREIGN PATENT DOCUMENTS

| | | |
|---|---|---|
| GB | 2011344 A | 7/1979 |
| JP | 2009-012781 A | 1/2009 |

(Continued)

OTHER PUBLICATIONS

U.S. Appl. No. 13/765,295, Advisory Action mailed Aug. 6, 2014, 3 pgs.

(Continued)

*Primary Examiner* — Carson Gross
(74) *Attorney, Agent, or Firm* — Schwegman Lundberg & Woessner, P.A.

(57) ABSTRACT

An example includes a method for forming tubular lengths of linear web material. The example can include winding a portion of linear web material in a tubular configuration such that opposite vertical ends of said linear portion overlap. The example can include welding said overlapping ends to fix said linear portion of linear web material in sleeve configuration. This welding can include heating up at a first temperature a first region of said portion over the whole of which said ends overlap and heating up at a second temperature lower than said first temperature a second region of said portion adjacent to said first region, said ends of said (Continued)

portion of linear web material overlapping over only a part of said second region.

6 Claims, 6 Drawing Sheets

(51) Int. Cl.

| | | |
|---|---|---|
| B65C 3/16 | (2006.01) | |
| B65C 3/00 | (2006.01) | |
| B65C 9/00 | (2006.01) | |
| B29C 65/78 | (2006.01) | |
| B29C 65/00 | (2006.01) | |
| B29C 63/42 | (2006.01) | |
| B29C 53/44 | (2006.01) | |
| B29C 65/22 | (2006.01) | |
| B65C 9/24 | (2006.01) | |
| B65C 9/26 | (2006.01) | |
| B65C 3/26 | (2006.01) | |
| B29L 31/00 | (2006.01) | |

(52) U.S. Cl.
CPC ........ *B29C 65/224* (2013.01); *B29C 65/7847* (2013.01); *B29C 65/7885* (2013.01); *B29C 66/1122* (2013.01); *B29C 66/232* (2013.01); *B29C 66/3452* (2013.01); *B29C 66/3472* (2013.01); *B29C 66/4322* (2013.01); *B29C 66/49* (2013.01); *B29C 66/81422* (2013.01); *B29C 66/8322* (2013.01); *B29C 66/91231* (2013.01); *B29C 66/91421* (2013.01); *B29C 66/91445* (2013.01); *B65C 3/00* (2013.01); *B65C 3/065* (2013.01); *B65C 9/00* (2013.01); *B65C 9/24* (2013.01); *B65C 9/26* (2013.01); *B29C 66/53245* (2013.01); *B29C 66/81811* (2013.01); *B29L 2031/744* (2013.01); *B65C 3/166* (2013.01); *B65C 3/26* (2013.01); *Y10T 156/1036* (2015.01); *Y10T 156/1038* (2015.01)

(58) Field of Classification Search
USPC ............... 156/DIG. 8–DIG. 13, DIG. 36
See application file for complete search history.

(56) References Cited

U.S. PATENT DOCUMENTS

| | | | |
|---|---|---|---|
| 8,241,447 B2* | 8/2012 | Thomasset | B29C 53/38 |
| | | | 156/203 |
| 2004/0031552 A1 | 2/2004 | Basque et al. | |
| 2008/0083504 A1 | 4/2008 | Zacche et al. | |
| 2011/0186236 A1* | 8/2011 | Pace | B29C 53/44 |
| | | | 156/538 |
| 2013/0206325 A1 | 8/2013 | Giuliani et al. | |

FOREIGN PATENT DOCUMENTS

| | | |
|---|---|---|
| WO | WO-2007148189 A1 | 12/2007 |
| WO | WO-2009125330 A2 | 10/2009 |

OTHER PUBLICATIONS

U.S. Appl. No. 13/765,295, Final Office Action mailed Apr. 23, 2014, 18 pgs.
U.S. Appl. No. 13/765,295, Non Final Office Action mailed Jan. 17, 2014, 13 pgs.
U.S. Appl. No. 13/765,295, Non Final Office Action mailed Sep. 22, 2014, 12 pgs.
U.S. Appl. No. 13/765,295, Response filed Mar. 17, 2014 to Non Final Office Action mailed Jan. 17, 2014, 9 pgs.
U.S. Appl. No. 13/765,295, Response filed Oct. 2, 2013 to Restriction Requirement mailed Sep. 3, 2013, 6 pgs.
U.S. Appl. No. 13/765,295, Response to Final Office Action mailed Apr. 23, 2014, 9 pgs.
U.S. Appl. No. 13/765,295, Restriction Requirement mailed Sep. 3, 2013, 8 pgs.
European Application Serial No. 13155140.0, European Search Report mailed May 16, 2013, 7 pgs.
European Application Serial No. 13155140.0, Response filed Dec. 24, 2013 to European Search Report mailed May 16, 2013, 7 pgs.
Italian Application Serial No. IT T020120125, Search Report dated Nov. 7, 2012, 7 pgs.
"Programmable logic controllers", <https://web.archive.org/web/20060426203611/http://www.allaboutcircuits.com/vol_4/chpt_6/6.html>, (Apr. 26, 2006), 16 pgs.

* cited by examiner

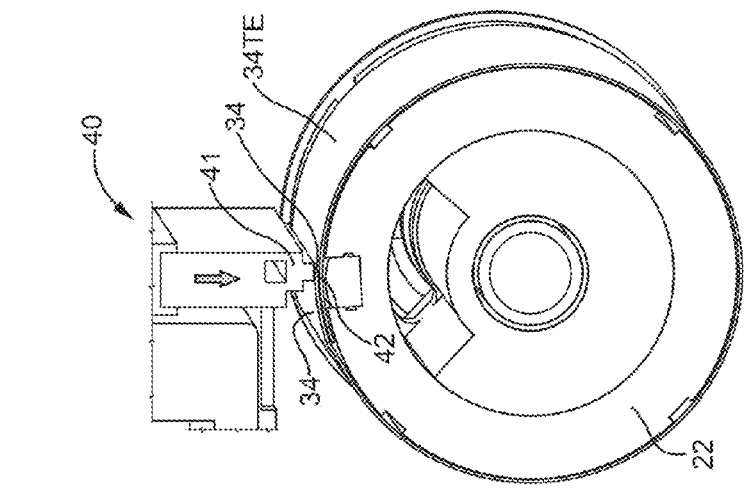
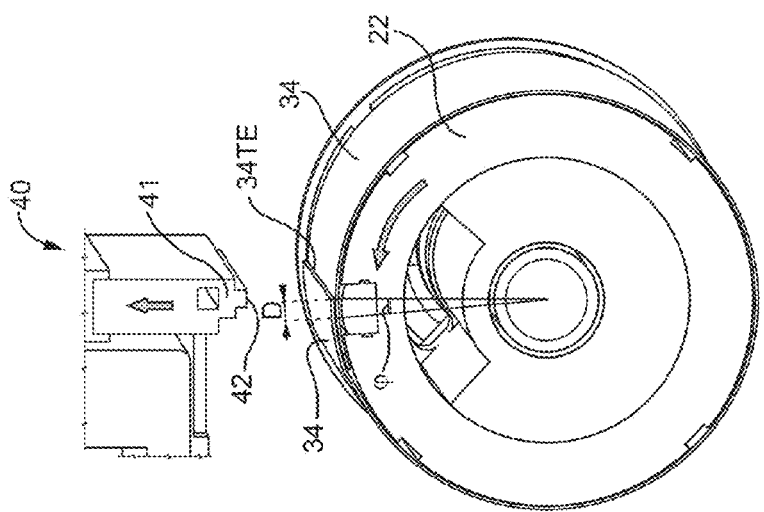
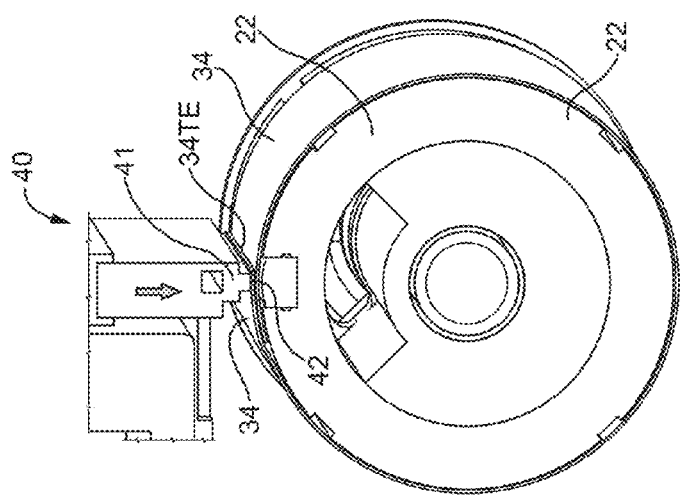

METHOD AND UNIT FOR FORMING TUBULAR LENGTHS OF WEB MATERIAL PARTICULARLY IN A LABELLING MACHINE

CLAIM OF PRIORITY

This patent application claims the benefit of priority, under 35 U.S.C. Section 365(c), to Mattia Giulliani et al. U.S. patent application Ser. No. 13/765,295, entitled "METHOD AND UNIT FOR FORMING TUBULAR LENGTHS OF WEB MATERIAL, PARTICULARLY IN A LABELLING MACHINE," filed on Feb. 12, 2013 which claims priority to Italian Patent Application Serial No. TO2012A 000125, filed on Feb. 13, 2012, each of which is hereby incorporated by reference herein in its entirety.

TECHNICAL FIELD

The present invention relates to a method and unit for forming tubular lengths of web material.

In particular, an example relates to a method and unit for shaping and sealing portions of a web material which are given a tubular configuration and which are intended to be fitted onto articles (especially containers for pourable food products, such as bottles, cans and so forth) for labelling purposes.

In the following, therefore, reference shall be made explicitly to labelling machines handling a web material for the manufacture of tubular lengths made of said web material to be used as labels.

However, this is not intended to limit the scope of protection of the claims attached, and the method for forming tubular lengths of web material disclosed herein may be conveniently applied to other types of machines, e.g. those for wrapping articles in a film-like material.

BACKGROUND

Labelling machines are commonly used to apply labels to containers of all sorts. These machines are very often used with bottles or other vessels destined to hold pourable food products are tubular labels (also commonly called "sleeve labels") which are obtained by:

cutting a web unwound from a supply roll into a plurality of rectangular or square portions;

winding each web portion in a tubular configuration such that opposite vertical edges overlap; and welding the overlapping edges to fix the web material in sleeve form.

A particular type of labelling machine is known wherein each tubular label is formed about a relative cylindrical winding body (commonly called "sleeve drum") and subsequently transferred onto a relative container, e.g. by introduction of the container inside the tubular label.

This type of labelling machine comprises a carousel rotating about a relative vertical axis to define a substantially circular path portion, along which the labelling machine receives respective successions of unlabelled containers and of rectangular or square labelling material portions from respective input wheels; allows application of sleeve labels onto corresponding containers and releases the labelled containers to an output wheel.

More specifically, the carousel comprises a number of operating units which are equally spaced about the rotation axis, are mounted along the periphery of the carousel and are moved by the latter along the above-mentioned circular path portion.

Each operating unit comprises a bottom supporting assembly adapted to support the bottom wall of a relative container and an upper retainer adapted to cooperate with the top portion of such container to hold it in a vertical position during the rotation of the carousel about the vertical axis.

Each supporting assembly comprises a vertical hollow supporting mount, secured to a horizontal plane of a rotary frame of the carousel, and a cylindrical winding body, engaging the supporting mount in sliding and rotating manner with respect to its axis, and adapted to carry a relative container on its top surface and a relative label on its lateral surface.

Each winding body is movable, e.g. under the control of cam means, between a raised position and a fully retracted position within the relative supporting mount.

In the raised position, each winding body protrudes from a top surface of the relative supporting mount and is adapted to receive a relative label on its lateral surface from the label input wheel; in particular the label is wrapped around the winding body such that the opposite vertical edges of the label overlap one another.

In the fully retracted position, which is reached at the container input and output wheels, the top surface of each winding body is flush with the top surface of the supporting mount so that containers are transferred onto and from the carousel along the same transfer plane.

After the welding of the overlapped edges of a tubular label, the movement of the relative winding body from the raised position to the fully retracted position produces the insertion of the relative container inside the label, making the so obtained container ready to be transferred to the output wheel.

For ensuring proper formation of tubular labels, the labelling web material is cut into rectangular or square portions having a length such that, when wound about respective winding bodies, their leading and trailing ends overlap, thus being weldable to one another with good reliability.

Therefore, in practice, the rectangular or square portions of labelling web material are cut into lengths in slight excess of the perimeter of the winding body, and the overlapping ends are welded, e.g. through localised heat application by means of a sealing bar, at a predetermined distance from the very edge of the radially external end, so that the sealing bar applies heat to an area where the two ends are superimposed. As a result, the excess amount of labelling web material used for the making of each sleeve label—which ultimately leads to an increased overall cost—remains on the sleeve label surface eventually applied on a respective container as an irregularity, which is generally looked upon as undesirable by food industry companies, particularly for aesthetic reasons.

SUMMARY

One or more examples of the present subject matter provide a method for sealing tubular lengths of web material that overcomes the above drawbacks in a straightforward and low-cost manner.

Furthermore, one or more examples of the present subject matter relate to a unit for forming tubular lengths of web material and to a labelling machine.

BRIEF DESCRIPTION OF THE DRAWINGS

A non-limiting embodiment of the present invention will be described by way of example with reference to the accompanying drawings, in which:

FIGS. 4 to 7 and 8A-B-C show a larger-scale, partly sectioned plan view of the forming unit of FIG. 3 in successive phases of a welding cycle for sealing a sleeve label according to the teachings of an example.

DETAILED DESCRIPTION

Figure 1:
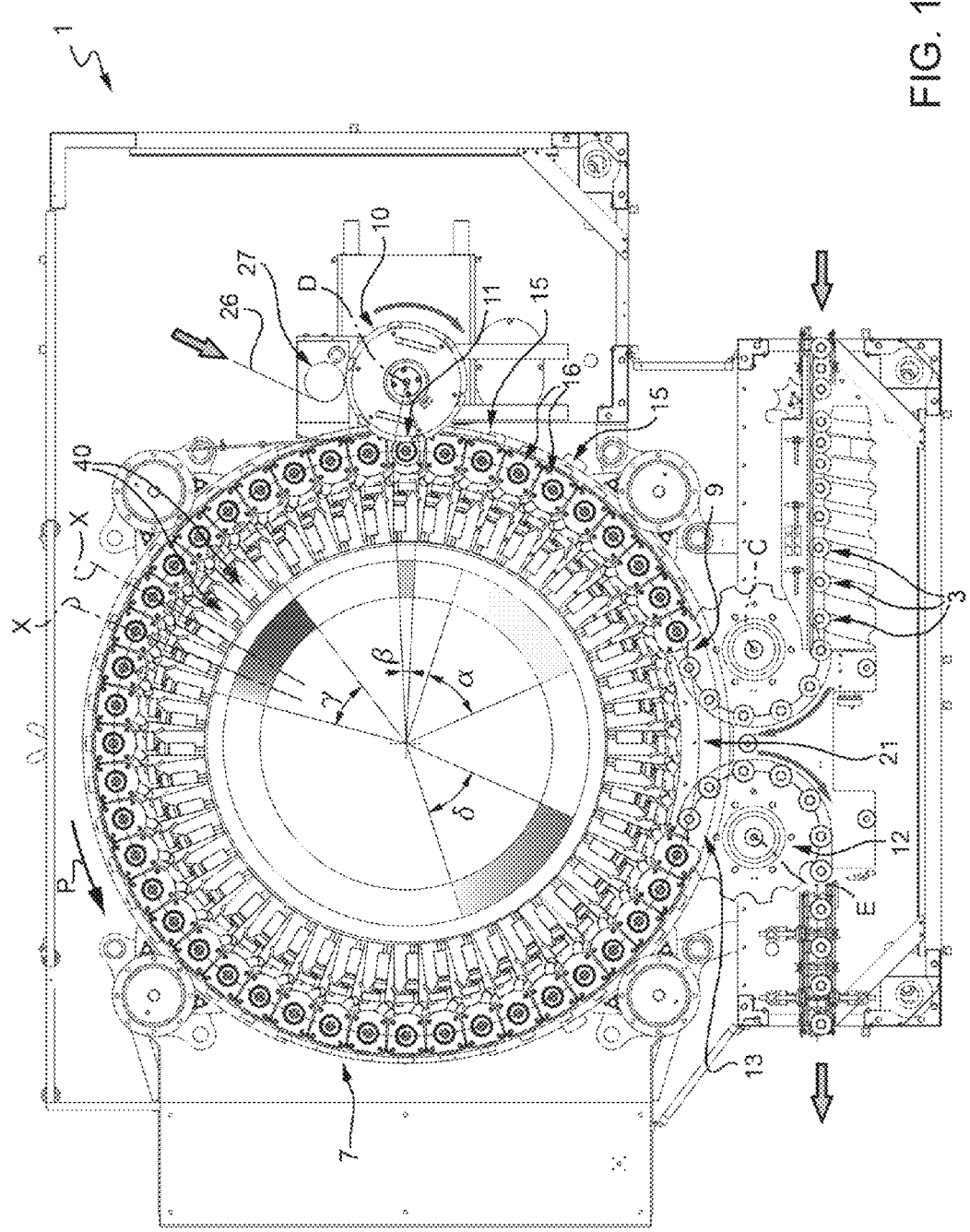
FIG. 1 shows a schematic plan view, with parts removed for clarity, of a labelling machine according to an example.

FIG. 1 illustrates a typical roll-fed labelling machine 1 for applying sleeve labels 2 (see FIGS. 2 and 3) to respective articles 3, in particular containers such as bottles, each of which (FIGS. 1 to 3) has a given longitudinal axis A, is bonded at the bottom by a bottom wall 4 substantially perpendicular to axis A, and has a top neck 5 substantially coaxial with axis A.

Labelling machine 1 comprises a conveying device for bending and welding labelling web material portions in a tubular configuration so as to form sleeve labels 2, and for producing the insertion of containers 3 into said sleeve labels 2.

In an embodiment as illustrated on the Figures, the conveying device comprises a carousel 7, which is mounted to rotate continuously (anticlockwise in FIG. 1) about a respective vertical axis B perpendicular to the plane of FIG. 1.

Carousel 7 receives a succession of unlabelled bottles 3 from an input wheel 8, which cooperates with carousel 7 at a first transfer station 9 and is mounted to rotate continuously about a respective longitudinal axis C parallel to axis B.

Carousel 7 also receives a succession of rectangular or square portions 2 of labelling web material from an input drum 10, which cooperates with carousel 7 at a second transfer station 11 and is mounted to rotate continuously about a respective longitudinal axis D parallel to axes B and C.

Carousel 7 releases a succession of labelled bottles 3 to an output wheel 12, which cooperates with carousel 7 at a third transfer station 13 and is mounted to rotate continuously about a respective longitudinal axis E parallel to axes B, C and D.

Carousel 7 comprises a number of operating units 15, which are equally spaced about axis B, are mounted at the periphery of carousel 7, by which they are moved along a circular path portion P extending about axis B and through transfer station 9, 11 and 13.

As shown in FIG. 1, transfer station 11 is arranged, along path P, downstream from transfer station 9 and upstream from transfer station 13.

Figure 2:
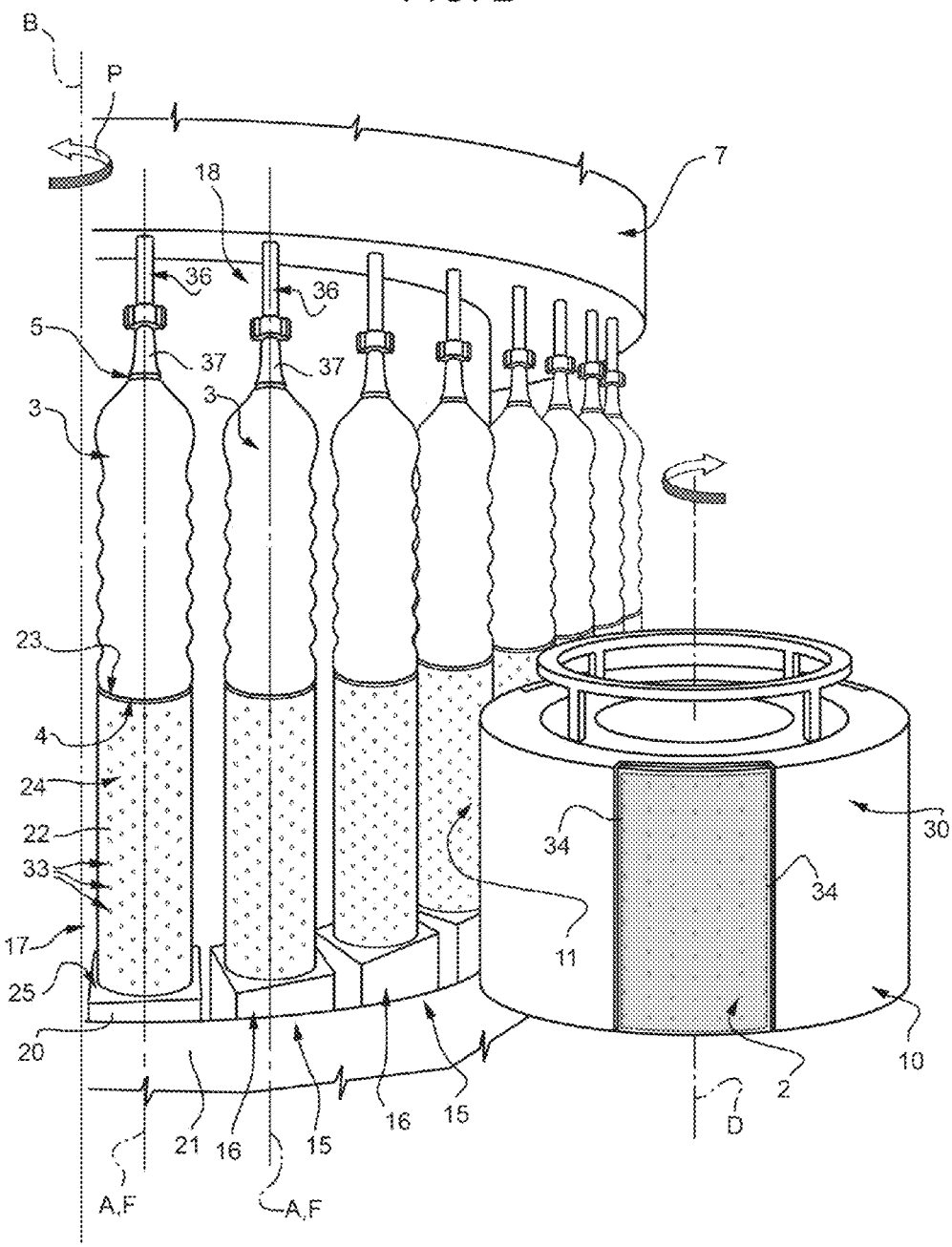
FIG. 2 shows a larger-scale view in perspective of a label transfer portion of the labelling machine of FIG. 1.
Figure 3:
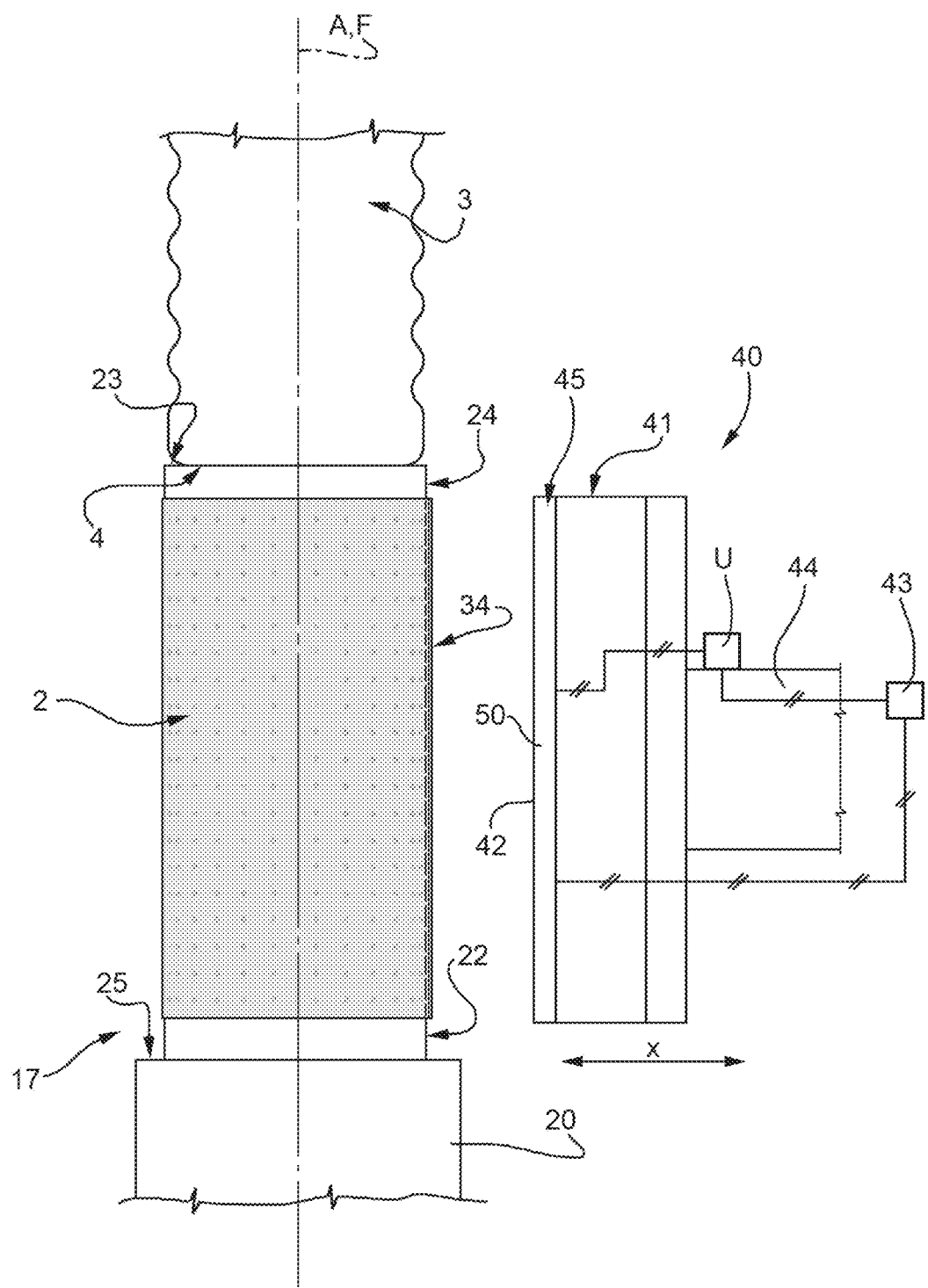
FIG. 3 shows a larger-scale, partly sectioned, lateral view, with parts removed for clarity, of a forming unit according to the teachings of an example.

With particular reference to FIGS. 2 and 3, each operating unit 15 comprises a conveying module 16 adapted to receive a relative bottle 3 from input wheel 8 in a vertical position, i.e. with the relative axis A parallel to axes B, C, D, and to hold said bottle 3 in such position along path P from transfer station 9 to transfer station 13.

Each conveying module 16 comprises a bottom supporting assembly 17 adapted to support the bottom wall 4 of a relative bottle 3 and an upper retainer 18 adapted to cooperate with the top neck 5 of the bottle 3.

In particular, each supporting assembly 17 comprises:

a hollow supporting mount 20, which has a vertical axis F, parallel to axes B, C, D and E, and is secured to a horizontal plane or table of a rotary frame 21 of carousel 7; and a substantially cylindrical winding body 22, engaging the supporting mount 20 in sliding and rotating manner with respect to axis F, and adapted to carry coaxially a relative bottle 3 on its top surface 23 and a relative label 2 on its lateral surface 24.

In particular, each winding body 22 can be moved along axis F in a known manner, under the control of cam means (not shown), between a fully retracted position within the relative supporting mount 20 and a raised position (FIGS. 2 to 5).

In the fully retracted position, each winding body 22 is completely housed within the relative supporting mount 20 so that its top surface 23 is flush with a top surface 25 of the supporting mount 20.

In the raised position, each winding body 22 protrudes from the top surface 25 of the relative supporting mount 20 and is adapted to receive, on its lateral surface 24, a relative label 2 from input drum 10.

More specifically, labelling web material portions 2 are cut in a known manner from a web 26 (FIG. 1) by a cutting device 27 (only schematically shown in FIG. 1) and fed to input drum 10 to be then transferred to the relative winding bodies 22.

As shown in FIG. 2, the cut portions 2 of labelling web material are retained on the lateral surface 30 of input drum 10 by suction; in fact, lateral surface 30 of input drum 10 is divided into a given number, e.g. three in the embodiment shown, of suction regions 31, which are equally spaced about axis D, are each provided with a plurality of through holes 32 connected to a pneumatic suction device (known per se and not shown) and are adapted to cooperate with respective portions of labelling web material 2.

In a completely analogous manner, the lateral surface 24 of each winding body 22 is provided with a plurality of through holes 33, in turn connected to a pneumatic suction device (known per se and not shown) so as to retain the relative portion 2 of labelling web material by suction.

At transfer station 11, each winding body 22 can be rotated in a known manner about the relative axis F under the control of relative actuator means (not shown) in order to produce the complete wrapping of the relative labelling web material portion 2, coming from input drum 10, on lateral surface 24. More specifically, each labelling web material portion 2, fed by input drum 10, is wrapped around the relative winding body 22 so as to form a substantially tubular sleeve with the opposite ends 34 overlapping.

As shown in FIG. 2, each retainer 18 comprises, in a known manner, a cylindrical movable member 36, which protrudes vertically from an upper portion of rotary frame 21 of carousel 7, can be displaced along the relative axis F and has a bell-shaped free end portion 37 adapted to cooperate with the top neck 5 of the bottle 3 carried by the corresponding bottom supporting assembly 17.

More specifically, the displacement of each movable member 36 is controlled in a known manner so as to maintain the same distance between its relative end portion 37 and the top surface 23 of the corresponding winding body 22, during the movement of the relative unit 15 along the segment of path portion P from transfer station 9 to transfer station 13, and to increase such distance at transfer stations 9, 13 and during the portion of path P from station 13 to station 9. Thus, containers 3 are securely held in the vertical position as they travel from station 9 to station 13 and are free to be transferred at stations 9 and 13 from input wheel 8 and to output wheel 12, respectively.

With reference to FIGS. 1 and 3, each operating unit 15 comprises a respective sealing device 40 arranged in front of, and in a position radially inner than, the relative conveying module 16; each sealing device 40 being adapted to cooperate with the portion 2 of labelling web material wrapped around the corresponding winding body 22 for welding the overlapping ends 34 thereof so as to produce a sleeve label 2'.

Each sealing device 40 basically comprises:

a sealing element 41 provided with a rectilinear strip-like active working surface 42 having a height at least equal to the height of the overlapping edges 34 to be welded;

power supplying means 43 selectively connectable to the sealing element 41; and an actuator assembly 44 for moving sealing element 41 to and from the relative overlapping edges 34 along a direction X transversal to path portion P.

As shown in FIG. 1, the directions X, along which sealing elements 41 move, extend radially with respect to axis B and, therefore, orthogonally to axes B-F.

Each sealing element 41 typically comprises a rectilinear bar-shaped main portion 45 which defines the afore-mentioned working surface 42.

More specifically, the main portion 45 of each sealing element 41 is formed by a longitudinal body 50, which defines internally a cooling conduit (not shown), continuously supplied with a refrigerant, such as water, from a cooler (not shown), and is externally covered by a heating layer, which can be heated by the electrical power supplying means 43 mentioned before.

The temperature of working surface 42 is advantageously controllable. More particularly, the operative temperature of working surface 42 is controllable so as to assume selectively at least a first and a second value T1 and T2 differing from each other, e.g. the first value T1 being greater than the second value T2.

Advantageously, operating unit 15 including sealing device 40 and winding body 22 is controllable to operate according to a method which will be described in detail in the following.

To this purpose, operating unit 15 comprises sensing means (not shown) for detecting the temperature of working surface 42 and a control unit U, which is:

operatively connected with said sensing means and with sealing element 41 (i.e. with working surface 42), power supplying means 43, actuator assembly 44;

and configured to manage operation of sealing device 40 according to said method.

FIGS. 4 to 7 and 8A-B-C show a succession of plan views of a detail of operating unit 15 including sealing device 40 with the relative winding body 22 about which a portion 2 of labelling web material has been wound to the extent that the relative ends 34 overlap, wherein said ends 34 are to be sealed to one another for forming a corresponding sleeve label 2'.

Figure 5:
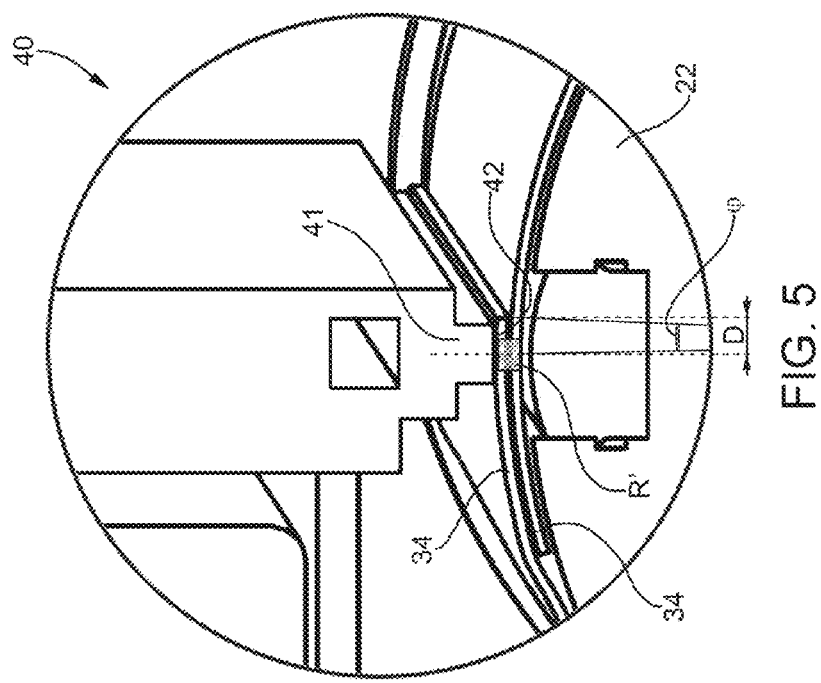
Figure 4:
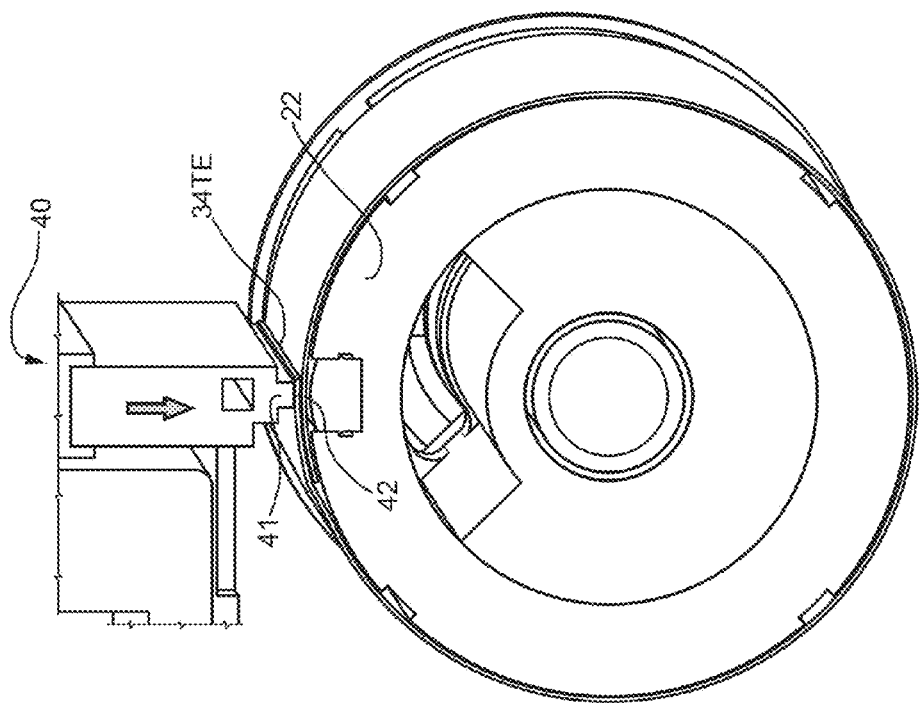

With particular reference to FIGS. 4 and 5, sealing element 41 is shown first with substantially the whole of working surface 42 cooperating with overlapping ends 34 of portion 2 of labelling web material at a first region R' over the whole of which ends 34 overlap (i.e. they are superimposed on one another).

First region (R') is linearly separated from the very trailing edge 34TE of portion 2 of web material by an arc having a predetermined length L.

In other words, substantially over the whole of first region R' the working surface 42 shall cooperate with two superimposed layers of labelling web material, this condition ensuring the proper sealing of sleeve label 2'.

To this purpose, working surface 42 of sealing element 41 is heated to a first temperature T1, which is sufficiently high for producing the welding of the two superimposed ends 34 of portion 2, e.g. by provoking the localised melting thereof. Thus, a sealed sleeve label 2' with an excess end 70 projecting from the substantially cylindrical surface thereof is obtained, said excess end 70 being substantially identified by trailing edge 34TE mentioned above.

Sealing element 41 is subsequently moved away (see FIG. 8A) from now mutually welded ends 34 of portion 2.

At the same time, winding body 22 bearing sealed sleeve label 2' is advantageously rotated (see FIG. 8B) about axis A by an angle φ subtended by an arc of length substantially equal to the afore-mentioned distance L.

In practice, trailing edge 34TE is thereby brought in substantial alignment with working surface 42 of sealing element 41 along axis X.

Sealing element 41 is subsequently moved (see FIG. 8C) along axis X towards winding body 22 in a position such that its working surface 42 cooperates (see FIGS. 6 and 7) with ends 34 at a second region R" substantially adjacent to first region R' (see FIG. 8B), ends 34 of portion 2 of labelling web material overlapping over only a part of second region R". In practice, trailing edge 34TE is, accordingly, held against and welded to the cylindrical surface of sleeve label 2'.

To this purpose, working surface of sealing element 41 is heated at a second temperature T2 lower than the first temperature T1 and sufficiently high for producing the welding of the trailing edge 34TE to the cylindrical surface of sleeve label 2' underneath without causing the localised melting of the latter.

Figure 7:
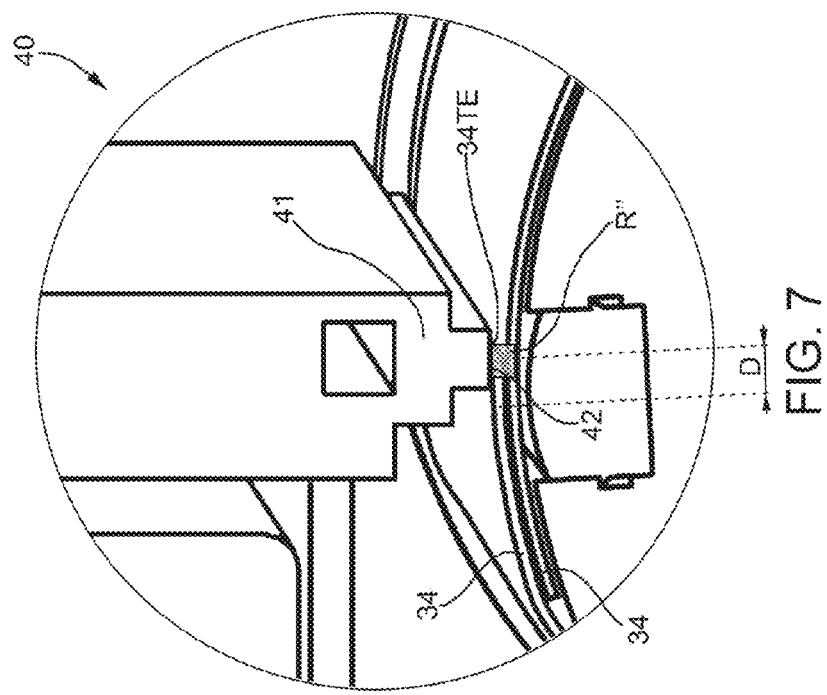
Figure 6:
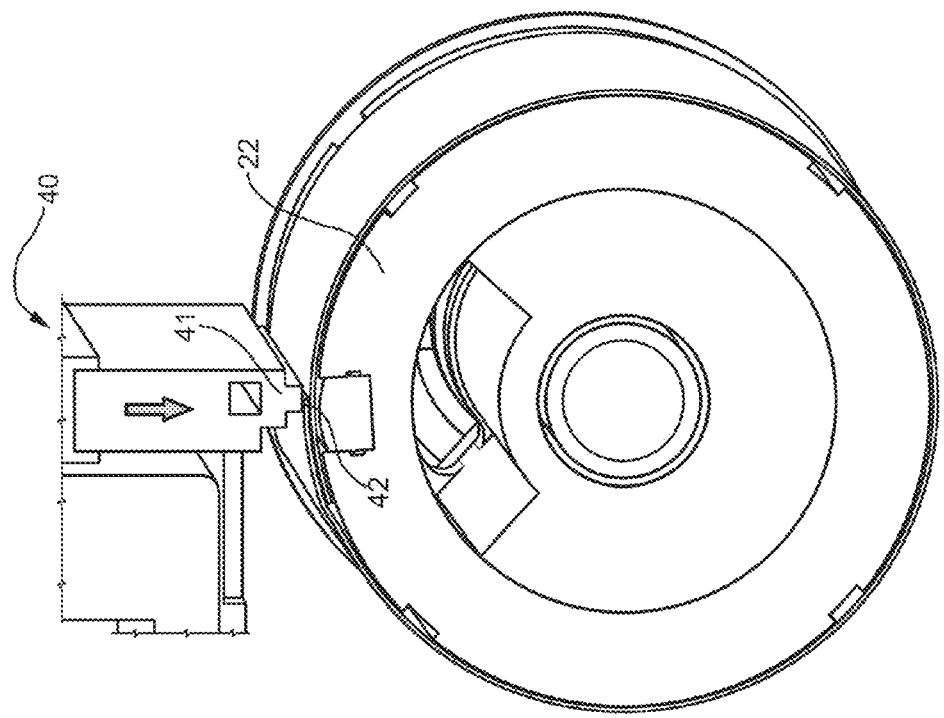

In practice, as shown in greater detail with reference to FIG. 7, part of working surface 42 shall cooperate with a single layer of labelling web material (i.e. the cylindrical surface of sleeve label 2').

According to the method just described, the excess end 70 which previously projected from the substantially cylindrical surface of sleeve label 2' is conveniently fixed to the cylindrical surface of sleeve label 2', hence the aesthetic quality of sleeve label 2' is significantly improved.

For implementing the method described above, sealing device 40 of operating unit 15 shall therefore be configured to heat up so that working surface 42 reaches a first temperature T1 when cooperating with a first region R' of portion 2, at which region R' ends 34 fully overlap; and so that working surface 42 reaches a second temperature T2 lower than first temperature T1 when cooperating with a second region R" substantially adjacent to first region R' and over only a part of which ends 34 overlap.

First and second operative temperatures T1, T2 may fall within a relatively large range, e.g. from 50 to 500° C., basically depending on the nature of the labelling web material handled.

The advantages of the method according to the present subject matter will be clear from the above description.

In particular, the method according to one or more example makes it possible to easily manufacture sleeve labels 2' having a particularly smooth surface, the excess labelling web material 34TE being thereby conveniently welded to the cylindrical surface of sleeve label 2'.

Furthermore, the characteristics of the method of on or more examples are such that it can be relatively easily implemented on an existing labelling machine, provided that the original operating units are replaced by forming according to on or more examples or modified so as to be capable of operating in accordance with the teachings of on or more examples.

Clearly, changes may be made to the method or sealing unit 40 as described and illustrated herein without, however, departing from the scope of protection as defined in the accompanying claims.

What is claimed is:

1. A method for forming tubular lengths of web material, comprising:
    winding a linear portion of the web material in a tubular configuration such that opposite vertical ends of said linear portion overlap; and
    welding said overlapping ends to fix said linear portion of web material in sleeve configuration, comprising:
        heating up at a first temperature a first region of said portion over the whole of which said ends overlap; and
        simultaneously heating up at a second temperature lower than said first temperature a second region of said portion adjacent to said first region, said ends of said portion of said web material overlapping over only a part of said second region.

2. The method according to claim 1, wherein said first temperature is sufficiently high for producing the welding of said overlapping ends of said portion, whereas said second temperature is sufficiently high for producing the welding of a trailing edge of said portion to a cylindrical surface of sleeve label without causing the latter to melt.

3. The method according to claim 1, wherein said first region is linearly separated from a trailing edge of said portion of said web material by an arc having a predetermined length.

4. The method according to claim 3, wherein said first and second regions are angularly separated by an angle subtended by said arc of said predetermined length.

5. A method for forming tubular lengths of web material, comprising:
    winding a linear portion of web material in a tubular configuration such that opposite vertical ends of said linear portion overlap; and
    welding said overlapping ends to fix said linear portion of web material in sleeve configuration, comprising:
        heating up at a first temperature a first region of said portion over which said ends overlap; and
        heating up at a second temperature lower than said first temperature a second region of said portion adjacent to said first region, said ends of said portion of said web material overlapping said second region.

6. The method according to claim 5, wherein said first temperature is sufficiently high for producing the welding of said overlapping ends of said portion, whereas said second temperature is sufficiently high for producing the welding of a trailing edge of said portion to a cylindrical surface of sleeve label.

\* \* \* \* \*